(12) United States Patent
Seo (10) Patent No.: US 10,717,448 B1
(45) Date of Patent: Jul. 21, 2020

(54) AUTOMATED TRANSFER OF VEHICLE CONTROL FOR AUTONOMOUS DRIVING

(71) Applicant: Atlas Robotics, Inc., Livermore, CA (US)

(72) Inventor: Youngwoo Seo, Livermore, CA (US)

(*) Notice: Subject to any disclaimer, the term of this patent is extended or adjusted under 35 U.S.C. 154(b) by 0 days.

(21) Appl. No.: 16/590,294

(22) Filed: Oct. 1, 2019

Related U.S. Application Data

(60) Provisional application No. 62/841,130, filed on Apr. 30, 2019.

(51) Int. Cl.
*B60W 50/14* (2020.01)
*G05D 1/00* (2006.01)
*H04W 4/44* (2018.01)
*H04W 4/38* (2018.01)
*B60W 50/00* (2006.01)

(52) U.S. Cl.
CPC .......... *B60W 50/14* (2013.01); *G05D 1/0088* (2013.01); *H04W 4/38* (2018.02); *H04W 4/44* (2018.02); *B60W 2050/0072* (2013.01); *B60W 2420/42* (2013.01); *B60W 2420/52* (2013.01); *B60W 2552/00* (2020.02); *B60W 2554/00* (2020.02); *B60W 2556/45* (2020.02); *G05D 2201/0213* (2013.01)

(58) Field of Classification Search
CPC ............ B60W 50/14; B60W 2420/42; B60W 2420/52; B60W 2550/14; B60W 2050/0072; B60W 2550/10; B60W 2550/40; B60W 2554/00; B60W 2556/45; B60W 2552/00; H04W 4/38; H04W 4/44; G05D 1/0088; G05D 2201/0213
See application file for complete search history.

(56) References Cited

U.S. PATENT DOCUMENTS

2014/0156133 A1* 6/2014 Cullinane ............ B60K 35/00 701/23
2017/0349186 A1* 12/2017 Miller ................ B60W 50/082

* cited by examiner

*Primary Examiner* — Michael V Keerigan (57) ABSTRACT

Provided herein are system, method and/or computer program product embodiments for the automated transfer of control in autonomous vehicles. An embodiment operates by retrieving configuration information specifying one or more vehicle control transfer events associated with a vehicle and determining, based on at least one of sensor data or a communications network message, that a vehicle control transfer event has occurred. The system then determines that a vehicle operator is available to manually operate the vehicle and if so transfers control of the vehicle from an autonomous driving system to a manual vehicle operation interface or a remote vehicle operation interface.

19 Claims, 5 Drawing Sheets

AUTOMATED TRANSFER OF VEHICLE CONTROL FOR AUTONOMOUS DRIVING

BACKGROUND

Technical Field

Embodiments generally relate to systems and methods for autonomous driving of vehicles.

Background

An autonomous vehicle, also known as a robotic vehicle, self-driving vehicle, automated driving system, or driverless vehicle, is a vehicle that is capable of sensing and navigating through its environment with little or no human input. Companies and research organizations have developed automated vehicle prototypes, and commercial introductions have begun and expected to increase rapidly in the coming years. However, many challenges and problems still remain that can impede mass adoption of these technologies.

For example, concerns still remain about whether autonomous vehicles are safe in the presence of pedestrians and jaywalkers. Accidents with both other vehicles and pedestrians have been reported. Autonomous vehicles are generally configured to drive slowly in urban areas with busy streets, making them less efficient than regular driving in certain situations. Solutions are needed to address shortcomings of autonomous driving technologies.

DETAILED DESCRIPTION

Provided herein are system, method and/or computer program product embodiments, and/or combinations and sub-combinations thereof, for the automated transfer of control in autonomous vehicles.

There are situations where transfer of vehicle control between a human driver, a remote operator and an automated driving system would be beneficial. For example, where the safety of pedestrians and jaywalkers is a concern, as a human driver under normal conditions will drive a car far more safer than any automated driving systems, the human driver may prefer to manually drive in downtown traffic and busy streets. However, for hours-long highway driving, the driver may be easily distracted and bored with featureless scenery and repetitive patterns of driving, and hence more prone to get involved in an accident. For such cases, automated driving system carries on hours-long highway driving like long-haul freight transports.

Embodiments described herein provide for a sliding autonomy (SA) system that can deliver automated transportation in a hybrid-way by seamlessly sliding the controls of a vehicle among participating entities among manual driving, remote driving, and autonomous driving. For example, the sliding autonomy system may allow a human driver to drive through a town until the vehicle arrives at a ramp of a highway. The system may then automatically switch the control of the vehicle operation to the autonomous driving system for the highway driving.

While such a switching of vehicle control between entities could be triggered manually, automating the switching system can allow users to disengage from paying attention to the road until necessary, providing a more convenient transportation experience. The sliding autonomy system aims at automatically determining the appropriate moment, timing, and manner of switching the control of vehicle operation based on driving contexts.

Figure 1:
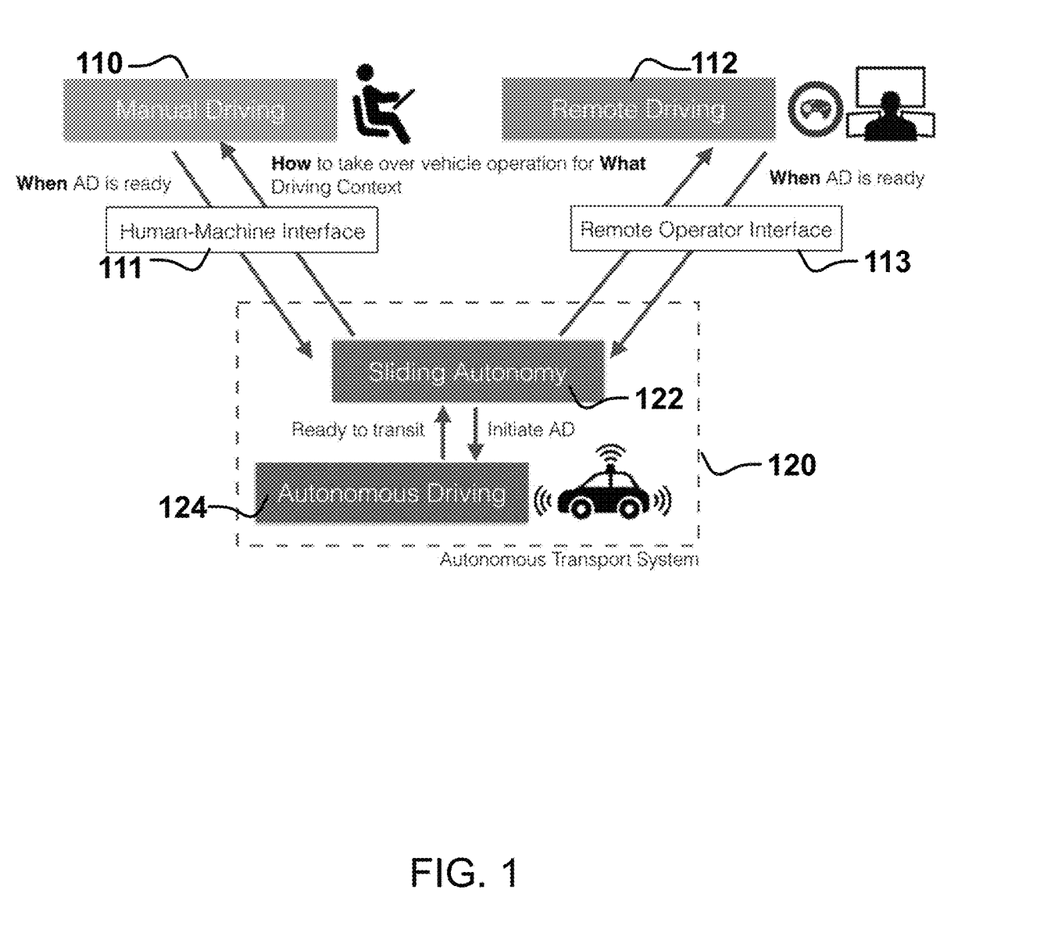

FIG. 1 shows the components involved in using a sliding autonomy driving system for a vehicle, according to particular embodiments. An autonomous transport system 120 may control a moving vehicle (car, truck, motorcycle, construction vehicle, agricultural vehicle etc.). Autonomous transport system 120 may be a combination of software and mechanical actuators that are configured to move the vehicle around an operating environment without bumping into any static and dynamic objects. A vehicle may be any mobile platform equipped with autonomous transport system 120 (e.g., self-driving car system), as well as a manual vehicle operation interface (e.g., standard steering-wheel control system, remote-controlled operation interface, etc.). The vehicle may transport a driver 110 that may take control of the vehicle at certain times, using any suitable human-machine interface 111 for controlling a vehicle (e.g., steering-wheel system). In particular embodiments, a remote operator 112 can also take control of the vehicle at certain times through a suitable remote operator interface 113 (e.g., networked computer system, remote controller, etc.). It should be understood that driver 110 and operator 112 may or may not be present at the vehicle. For example, in particular embodiments, the remote operator may be on stand-by in case a situation occurs where neither the autonomous transport system 120 nor driver 110 can take control of the vehicle. In another embodiment, the vehicle does not have any driver 110 or passenger, and is solely operable through remote operator interface 113.

Remote operator interface 113 may communicate with autonomous transport system 120 through any suitable communications network. The network may be any communications network suitable for transmitting data between computing devices, such as, by way of example, a Local Area Network (LAN), a Wide Area Network (WAN), Metropolitan Area Network (MAN), Personal Area Network (PAN), the Internet, wireless networks, satellite networks, overlay networks, or any combination thereof. Remote operator interface 113 may be provided through any suitable computing device, such as, by way of example, a personal computer, mobile computer, laptop computer, mobile phone, smartphone, personal digital assistant, or tablet computer.

Autonomous transport system 120 may include a sliding autonomy subsystem 122 and an autonomous driving subsystem 124. Subsystems 122 and 124 may be comprised of any suitable combination of software and/or hardware configured to perform their respective functions. Autonomous driving system 124 may comprise autonomy software and/or robotic software to control mechanisms such as actuators to control and operate the vehicle. Autonomous driving system 124 may include or communicate with hardware such as cameras and sensors to obtain information about environmental conditions around the vehicle (e.g., streets, cars, street lights, pedestrians, etc.), and use this information to move the vehicle in a given operating environment without bumping into any dynamic or static obstacles. Sliding autonomy system 122 may also receive information about the environment (either directly or through autonomous driving system 124), and use the information to make decisions on when and how to transfer control from the driver to the autonomous system, and vice versa.

While systems and subsystems 122 and 124 have been described as separate components forming part of system 120, it should be understood that this disclosure is not limited to these boundaries. The boundaries of these functional building blocks have been arbitrarily defined herein for the convenience of the description. As an example, sliding autonomy subsystem 122 may be implemented in or as a submodule of autonomous driving system 124. Alternate boundaries can be defined as long as the specified functions and relationships (or equivalents thereof) are appropriately performed.

Autonomous transport system 120 may be implemented through any suitable computing device or combination of devices. Computing devices may reside locally in a vehicle, remotely (e.g., through a cloud service), or any combination thereof. By way of example, autonomous transport system 120 may take the form of on-board computers, server computers, database systems, storage area networks, web servers, application servers, or any combination thereof.

Figure 2:
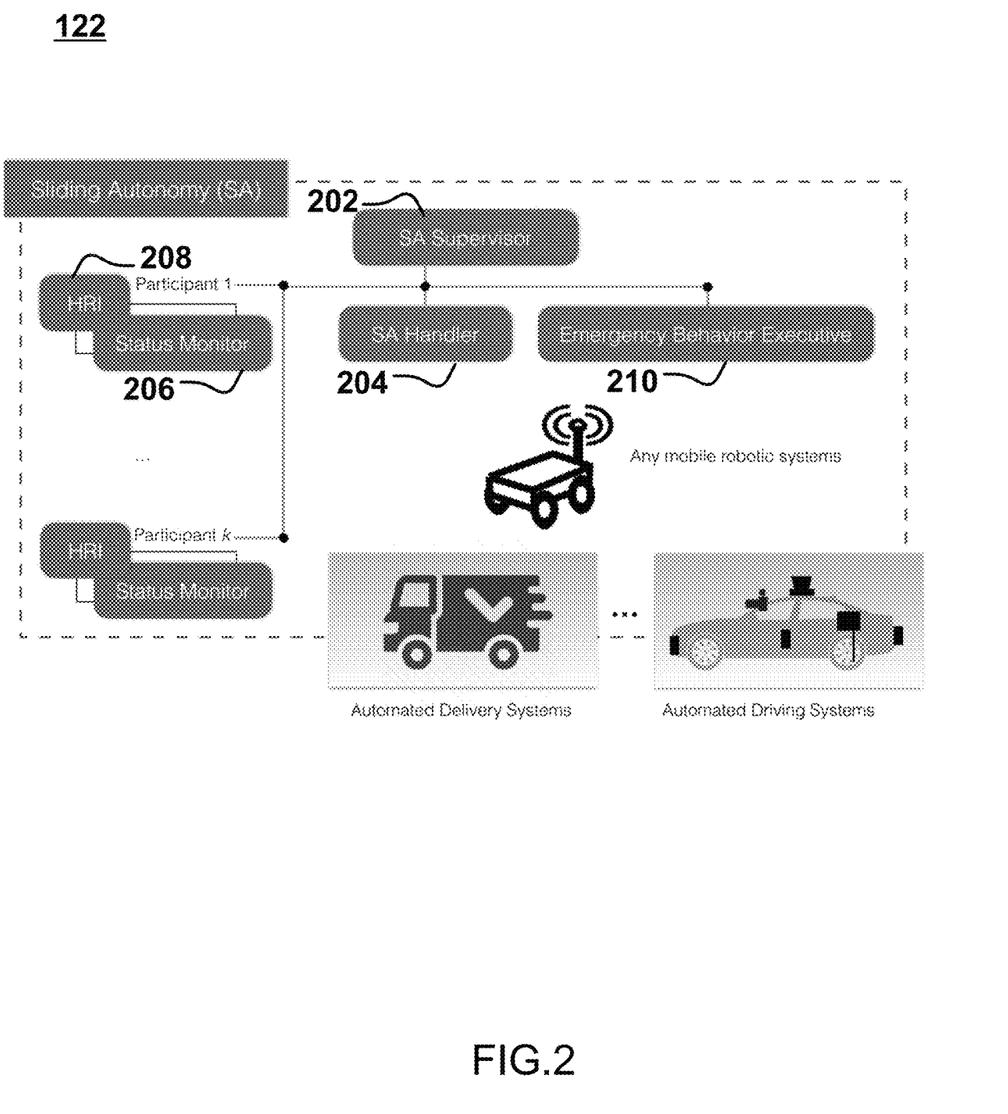

FIG. 2 shows components forming part of sliding autonomy subsystem 122, according to particular embodiments. SA subsystem 122 includes a sliding autonomy supervisor 202 that keeps track of the state of the vehicle, the driving route and the entities involved in the autonomous driving environment. In particular embodiments, SA supervisor 202 runs as a background or daemon process that implements a finite state machine for the sliding autonomy subsystem 122 associated with a task. As an example, a task may be to deliver a package from a warehouse to a residential place. SA supervisor 202 may transition through states that form part of the task, such as driving the vehicle along a route, initiate takeovers to/from manual and automatic control, initiating emergency pull overs, etc. To determine the states, SA supervisor 202 may use any suitable sensor and data inputs, such as, for example, camera, lidar point clouds, radar targets, an object detector (e.g., any combination of hardware and/or software for object detection), an object tracker (e.g., any combination of hardware and/or software for object tracking), a road-geometry understander (e.g., any combination of hardware and/or software for understanding road geometry), a scene understander (e.g., any combination of hardware and/or software for understanding driving scenes), etc. SA supervisor 202 may analyze these inputs to determine current and upcoming states, such as entering a highway ramp, approaching a work zone, etc.

SA supervisor 202 communicates with SA handler 204, status monitors 206, human-robot interaction (HRI) components 208, and emergency behavior executive 210. SA handler 204 analyzes from sensors and autonomous driving subsystem 124 to automatically trigger or initiate a takeover. SA handler 204 may further supervise transition of a vehicle operation between individuals. Status monitors 206 may be associated with participants of the system, for example, a status monitor for the driver inside the vehicle, another status monitor for a remote operator, the other status monitor for the automated driving system, etc. Status monitors 206 may determine if a person is ready to assume control of the vehicle through, for example, sensors, user input prompts, etc. HRI components 208 generate a user interface providing information about the current driving scenario for users of autonomous transport system 120. HRI components 208 may provide, for example, intuitive signages showing current progress along a route, points of interest, digested sensor data with perception outputs, indications of what to do or where to look at for seamless sliding of autonomy between the participants.

Emergency behavior executive 210 may handle any unexpected or emergency cases where transitions of autonomy cannot be completed. For example, SA handler 204 may trigger a transfer of vehicle control from autonomous driving subsystem 124 to a human driver in the vehicle. SA supervisor 202 may attempt to initiate the transfer and obtain information from the status monitor 206 associated with the driver. However, if the status monitor 206 indicates that the driver is not ready to take control of the vehicle, SA supervisor 202 may initiate the emergency behavior executive to initiate a maneuver to secure the vehicle at a safe place, e.g., pulling over at the shoulder of the road.

Figure 3:
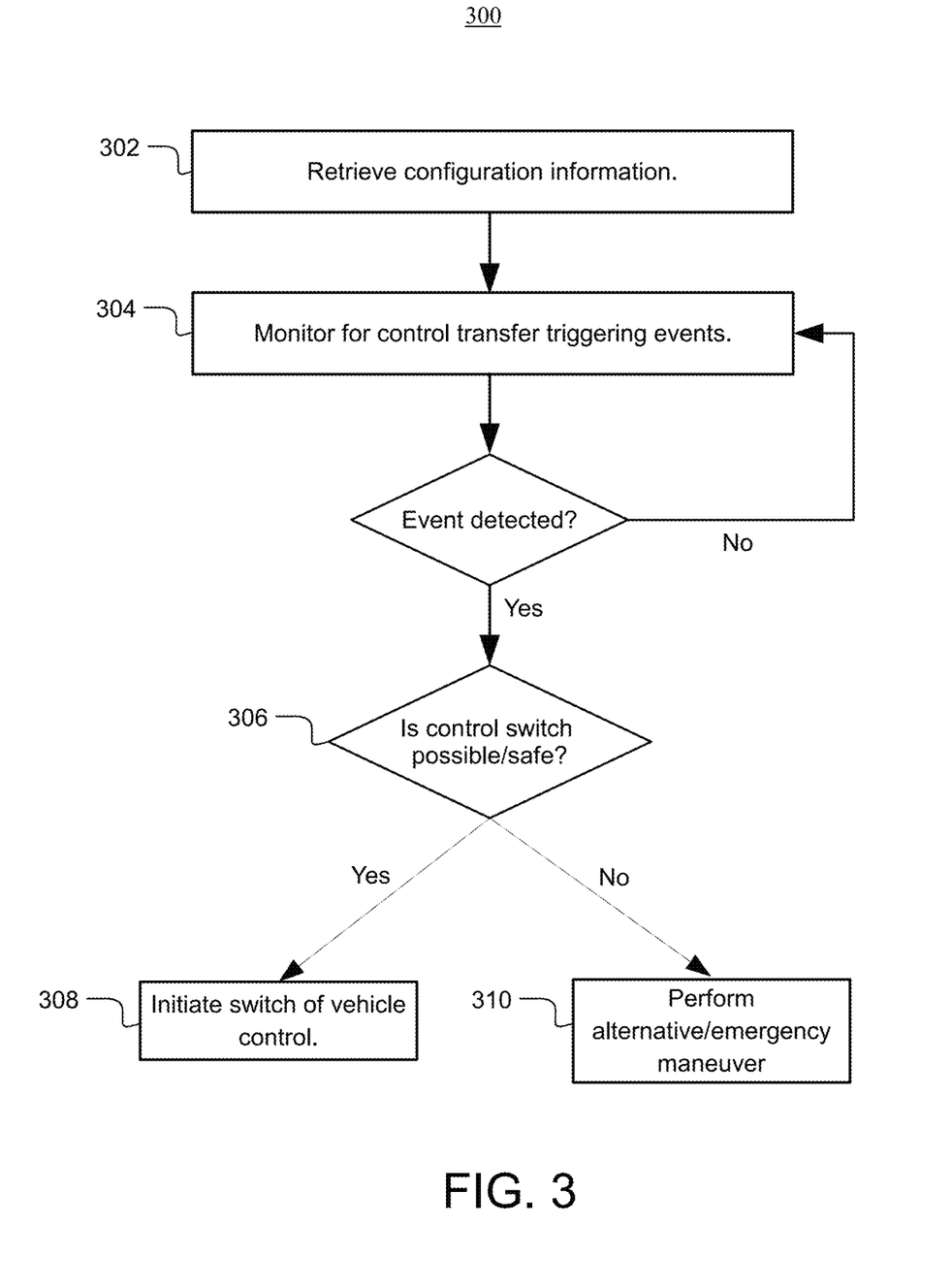
Figure 4:
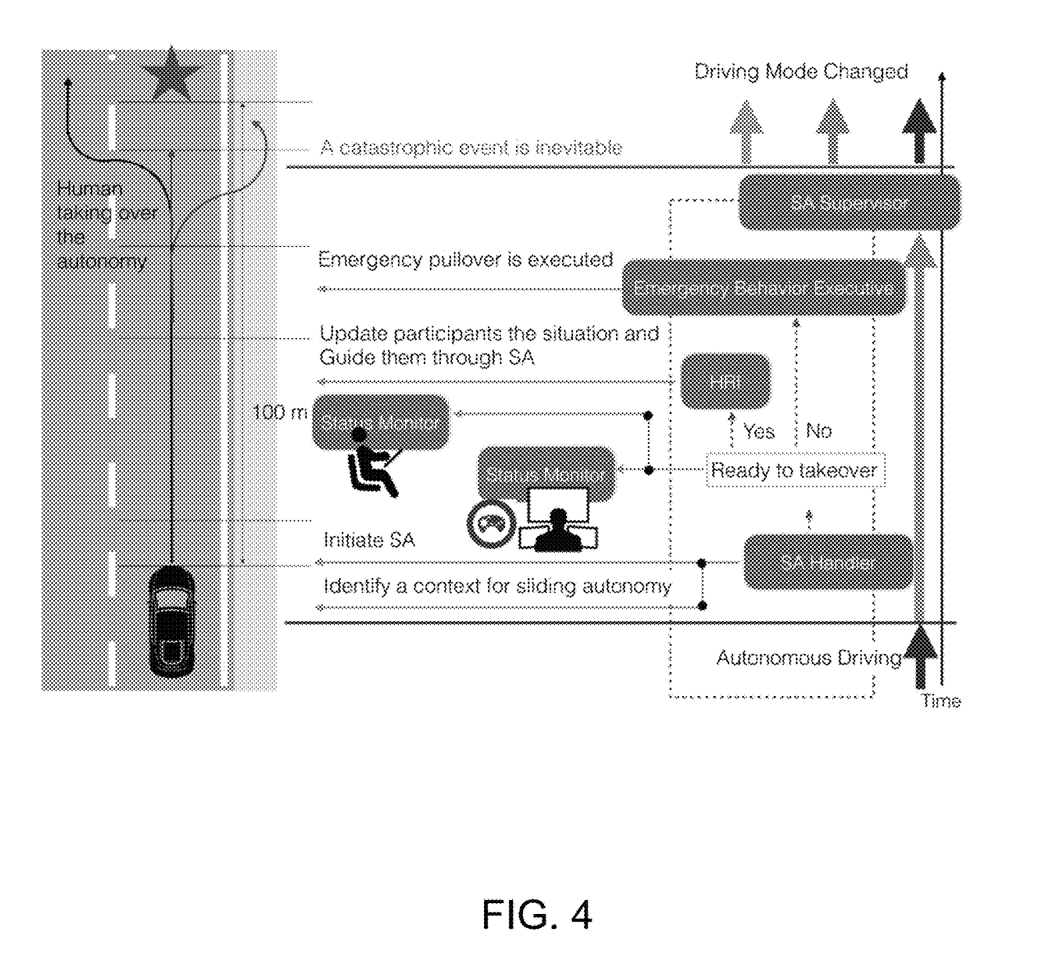

FIG. 3 is a flowchart for a method 300 for the automated transfer of control in autonomous vehicles, according to an example embodiment. Method 300 can be performed by processing logic that can comprise hardware (e.g., circuitry, dedicated logic, programmable logic, microcode, etc.), software (e.g., instructions run on a processing device), or a combination thereof. FIG. 4 illustrates the steps of method 300 across time (moving up), according to particular embodiments.

In step 302, SA supervisor 202 retrieves configuration information specifying conditions that trigger a transfer of vehicle control. The configuration information may be provided by a driver or remote operator through any suitable means, for example, through a graphical user interface. In particular embodiments, the conditions may be selected from a predetermined list. Example conditions when control may be transferred from autonomous driving subsystem 124 to a driver/operator may include, by way of example and not limitation:

Entering a highway off-ramp.
When construction or work zone is recognized.
When an accident is recognized.
High traffic in urban area is recognized.
High number of pedestrians is recognized.
Extreme weather conditions are recognized.
Autonomous driving subsystem or sensor failure recognized.

Example conditions when control may be transferred from a driver/remote operator to autonomous driving system 124 may include, by way of example and not limitation:

Entering a highway on-ramp.
At particular time of day (e.g., night time).
Exiting a construction zone, accident area, high traffic zone, etc.

In step 304, SA handler 204 continuously monitors for triggering events. Monitoring may occur through any suitable means, such as, for example, analysis of information obtained from sensors, communications network, alerts, etc. In particular embodiments, SA handler 204 send a request to SA supervisor 202 to initiate a transfer of vehicle control based on the observed data and the retrieved configuration information.

For example, a Global Navigation Satellite System (GNSS), e.g., Global Positioning System (GPS), a proprietary pose estimator, and/or a localization system based on a proprietary high-definition maps can be used to determine a highway on-ramp or off-ramp is approaching. In another example, accident, traffic, construction zone, weather, and any other relevant information may be obtained through a communications network. In another example, accident, traffic, construction zone, weather and any other relevant information may be gathered through analysis of autonomous driving sensors in the vehicles (e.g., cameras, sensors, windshield sensors, etc.) A readiness state of participants to takeover vehicle control may be determined by the status monitor 206 with analysis of data from eye movement sensors, steering wheel sensors, voice prompts, touchscreen prompts, etc.

In step 306, SA supervisor 202 may receive the request for vehicle control transfer and determines whether a transfer of vehicle control is possible and safe in the particular circumstances. In particular embodiments, SA supervisor 202 may estimate a number of time frames before a switch in vehicle control is desired. For example, the SA supervisor 202 may recognize that the vehicle is approaching a work zone and will arrive at it in 10 seconds. Based on the configuration, SA supervisor 202 may determine this is enough time to perform a control switch and moves to step 308 to initiate the switch. If SA supervisor 202 determines there is not enough time to perform a switch, the subsystem may move to step 310 and trigger an alternative maneuver (e.g., an emergency pull over to the shoulder) or may simply not perform the switch and continue in the same control mode (i.e., move back to step 304).

In step 208, SA supervisor 202 initiates a switch of vehicle control. In particular embodiments, SA supervisor 202 may query one or more status monitors 206 to determine if participating entities are ready for the transfer of vehicle control. For example, if the subsystem is switching from autonomous control to manual driver control, status monitor 206 may first issue an alert to driver 110 that he/she should prepare to take control of the vehicle. The alert may be issued through any suitable means, e.g., a sound, a synthesized voice message, an on-board screen display, a haptic device, etc. Status monitor 206 may indicate that the participant is not ready until it receives confirmation from the user, e.g., a button input, touchscreen input, voice command, software for estimating the intentions of passengers/drivers from their behaviors, etc. For example, status monitor 206 may trigger a message for the user saying "Please place your hands on the steering wheel and say 'ready' to confirm that you are ready to assume control of the vehicle." If the user performs these actions, status monitor 206 then determines the user is ready to take over control of the vehicle.

In particular embodiments, if driver 110 fails to provide confirmation and status monitor 206 does not indicate participant readiness, SA supervisor 202 initiate a transfer of control to a remote operator 112. Again, status monitor 206 may transmit a communication prompting a remote operator 112 to take control of the vehicle. If driver 110 or remote operator 112 provide confirmation, SA supervisor 202 transfers control of the vehicle by triggering the deactivation of autonomous driving system 124 and reactivation of manual or remote driving of the vehicle. If remote operator 112 also fails to provide confirmation, the subsystem may move to step 310 and emergency behavior executive may trigger an alternative maneuver (e.g., an emergency stop at the shoulder) or may simply not perform the switch and continue in the same control mode (i.e., move back to step 304). Once a switch of vehicle control is finalized, SA supervisor 202 may return to the initial step 302 to wait for any conditions that may trigger a control switch.

Figure 5:
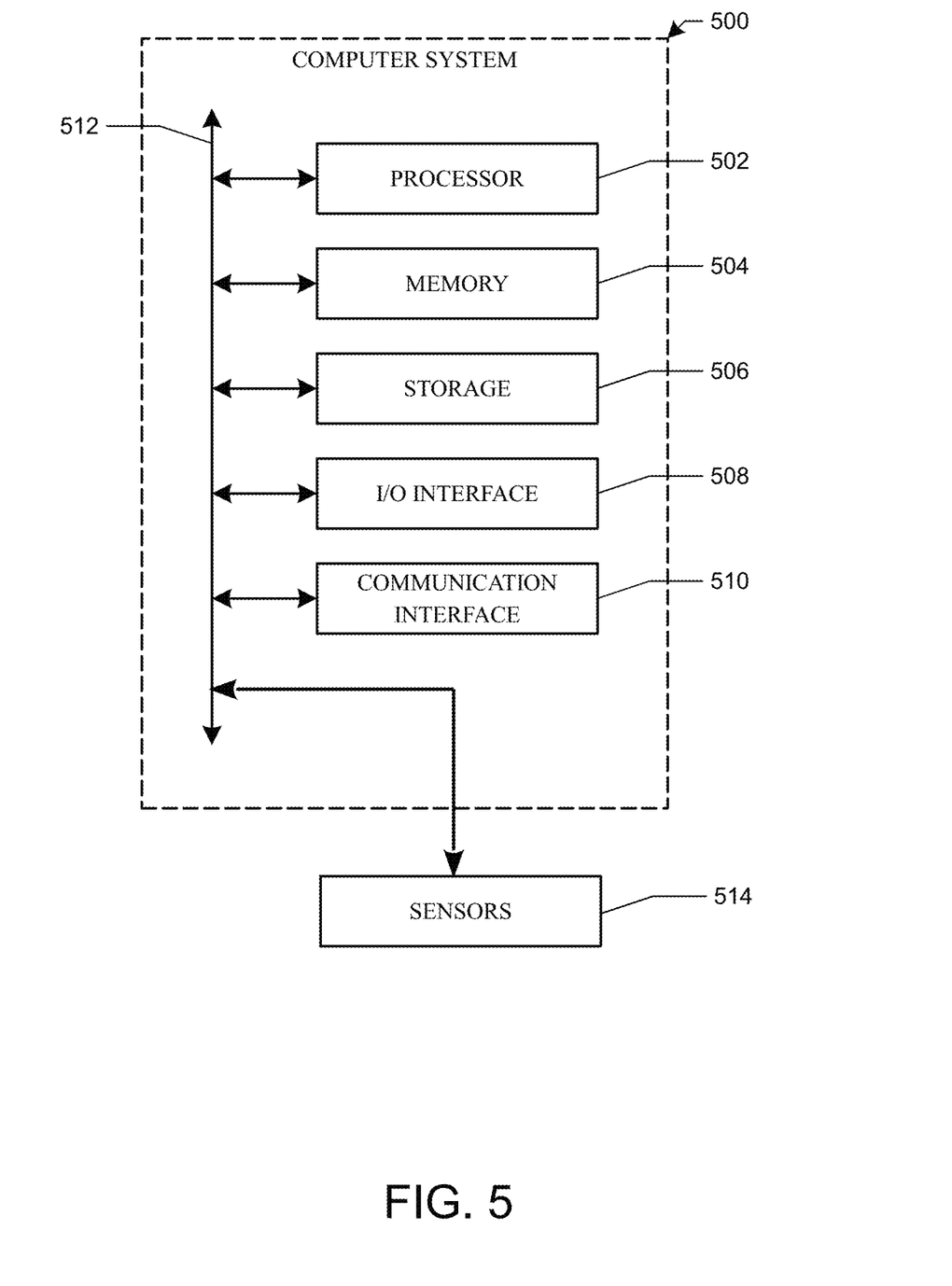

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate. In addition, a computer system may be functional-safety compliant if necessary.

This disclosure contemplates any suitable number of computer systems 500. This disclosure contemplates computer system 500 taking any suitable physical form. As example, computer system 500 may be an embedded computer system, a desktop computer system, a laptop or notebook computer system, a mainframe, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, memory 504 includes random access memory (RAM). This RAM may be volatile memory, where appropriate Memory 504 may include one or more memories 504, where appropriate. Although this disclosure describes and illustrates particular memory, this disclosure contemplates any suitable memory.

In particular embodiments, storage 506 includes mass storage for data or instructions. As an example, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. In particular embodiments, computer system 500 may communicate with one or more sensors 514. Sensors 514 may include sensors suited for self-driving vehicles, such as, for example, infrared sensors, video cameras, motion sensors, microphones, etc. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

What is claimed is:

1. A computer-implemented method comprising, by at least one processor:
    retrieving configuration information specifying one or more vehicle control transfer events associated with a vehicle;
    continuously monitoring data from one or more sensors, one or more computer systems, or a communications network for a triggering event, the monitoring comprising analyzing the data based on the configuration information;
    determining, based on the monitoring, that a vehicle control transfer event has occurred in response to the monitoring data indicating that the triggering event has occurred; and
    responsive to the determining that the vehicle control transfer event has occurred, performing the steps of:
        estimating a vehicle control transfer time frame based on the configuration information and the data from the one or more sensors, the one or more computer systems, or the communications network,
        selecting, based on the estimated time frame and the data from the one or more sensors, the one or more computer systems, or the communications network, a first manual vehicle control operator interface for receiving control of the vehicle,
        determining a readiness state of a vehicle operator of the first manual vehicle control operator interface to manually operate the vehicle, and
        transferring, based on a lack of readiness, control of the vehicle from an autonomous driving system to a second manual vehicle control operator interface.

2. The method of claim 1, further comprising:
    determining, based on the data from the one or more sensors, the one or more computer systems, or the communications network, that a second vehicle control transfer event has occurred; and
    transferring control of the vehicle from the first or second manual vehicle control operator interface to the autonomous driving system.

3. The method of claim 1, wherein the retrieving configuration information comprises receiving the configuration information wirelessly through the communications network.

4. The method of claim 1, wherein the determining the vehicle control transfer event has occurred further comprises determining a state of the autonomous driving system, wherein the determining the vehicle control transfer event has occurred is based on the determined state of the autonomous driving system.

5. The method of claim 4, wherein determining the state of the autonomous driving system is based on data from at least one of a camera, lidar point clouds, radar targets, an object detector, an object tracker, a road-geometry detector, and a scene detector.

6. The method of claim 1, wherein the determining the readiness state of the vehicle operator comprises analyzing the data from the one or more sensors to determine if the vehicle operator is available.

7. The method of claim 1, wherein the determining the readiness state of the vehicle operator comprises:
    providing one or more instructions through a user interface;
    determining that the vehicle operator has followed the one or more instructions; and
    responsive to the determining that the vehicle operator has followed the one or more instructions, completing a transfer of control of the vehicle from the autonomous driving system to the first manual vehicle control operator interface.

8. The method of claim 1, wherein the first manual vehicle control operator interface comprises one or more devices within the vehicle for controlling the vehicle by the vehicle operator, the vehicle operator of the first manual vehicle control operator interface being a driver, and wherein the second manual vehicle control operator interface comprises one or more remote devices that transmit instructions through a communications interface to the vehicle for remote operation.

9. The method of claim 1, wherein the first manual vehicle control operator interface comprises one or more remote devices that transmit instructions through a communications interface to the vehicle for remote operation, and wherein the second manual vehicle control operator interface comprises one or more devices within the vehicle for controlling the vehicle by the vehicle operator, the vehicle operator of the second manual vehicle control operator interface being a driver.

10. A system, comprising:
    a non-transitory memory; and
    at least one processor coupled to the memory and configured to:
        retrieve configuration information specifying one or more vehicle control transfer events associated with a vehicle;
        continuously monitor data from one or more sensors, one or more computer systems, or a communications network for a triggering event, the monitoring comprising analyzing the data based on the configuration information;
        determine, based on the monitoring, that a vehicle control transfer event has occurred in response to the monitored data indicating that the triggering event has occurred; and responsive to the determining that the vehicle control transfer event has has occurred, performing steps of:
estimate a vehicle control transfer time frame based on the configuration information and the data from the one or more sensors, the one or more computer systems, or the communications network,
select, based on the estimated time frame and the data from the one or more sensors, the one or more computer systems, or the communications network, a first manual vehicle control operator interface for receiving control of the vehicle,
determine a readiness state of a vehicle operator of the first manual vehicle control operator interface to manually operate the vehicle, and
transfer, based on a lack of readiness, control of the vehicle from an autonomous driving system to a second manual vehicle control operator interface.

11. The system of claim 10, the at least one processor further configured to:
determine, based on at least one of the data from the one or more sensors, the data from the one or more computer systems, or a message from the communications network that a second vehicle control transfer event has occurred; and
transferring control of the vehicle from the first or second manual vehicle control operator interface to the autonomous driving system.

12. The system of claim 10, wherein the retrieving configuration information comprises receiving the configuration information wirelessly through the communications network.

13. The method system of claim 10, wherein the determining the vehicle control transfer event has occurred further comprises determining a state of the autonomous driving system, wherein the determining the vehicle control transfer event has occurred is based on the determined state of the autonomous driving system.

14. The system of claim 13, wherein determining the state of the autonomous driving system is based on data from at least one of a camera, lidar point clouds, radar targets, an object detector, an object tracker, a road-geometry detector, and a scene detector.

15. A tangible non-transitory computer-readable device having instructions stored thereon that, when executed by at least one computing device, causes the at least one computing device to perform operations comprising:
retrieving configuration information specifying one or more vehicle control transfer events associated with a vehicle;
continuously monitoring data from one or more sensors, one or more computer systems, or a communications network for a triggering event, the monitoring comprising analyzing the data based on the configuration information;
determining, based on the monitoring, that a vehicle control transfer event has occurred in response to the monitored data indicating that the triggering event has occurred; and
responsive to the determining that the vehicle control transfer event has occurred, performing the steps of:
estimating a vehicle control transfer time frame based on the configuration information and the data from the one or more sensors, the one or more computer systems, or the communications network,
selecting, based on the estimated time frame and the data from the one or more sensors, the one or more computer systems, or the communications network, a first manual vehicle control operator interface for receiving control of the vehicle,
determining a readiness state of a vehicle operator of the first manual vehicle control operator interface to manually operate the vehicle, and
transferring, based on a lack of readiness, control of the vehicle from an autonomous driving system to a second manual vehicle control operator interface.

16. The computer-readable device of claim 15, the operations further comprising:
determining, based on at least one of the data from the one or more sensors, the data from the one or more computer systems, or a message from the communications network, that a second vehicle control transfer event has occurred; and
transferring control of the vehicle from the first or second manual vehicle control operator interface to the autonomous driving system.

17. The computer-readable device of claim 15, wherein the retrieving configuration information comprises receiving the configuration information wirelessly through the communications network.

18. The computer-readable device of claim 15, wherein the determining the vehicle control transfer event has occurred further comprises determining a state of the autonomous driving system, wherein the determining the vehicle control transfer event has occurred is based on the determined state of the autonomous driving system.

19. The computer-readable device of claim 18, wherein determining the state of the autonomous driving system is based on data from at least one of a camera, lidar point clouds, radar targets, an object detector, an object tracker, a road-geometry detector, and a scene detector.

* * * * *